United States Patent
Shin et al.

[11] Patent Number: 6,014,416
[45] Date of Patent: Jan. 11, 2000

[54] METHOD AND CIRCUIT FOR DETECTING DATA SEGMENT SYNCHRONIZING SIGNAL IN HIGH-DEFINITION TELEVISION

[75] Inventors: Hyun-Soo Shin; Dong-Seog Han, both of Suwon, Rep. of Korea

[73] Assignee: Samsung Electronics Co., Ltd., Kyungki-do, Rep. of Korea

[21] Appl. No.: 08/877,238

[22] Filed: Jun. 17, 1997

[30] Foreign Application Priority Data

Jun. 17, 1996 [KR] Rep. of Korea ...................... 96/21886
May 29, 1997 [KR] Rep. of Korea ...................... 97/21547

[51] Int. Cl.[7] .................................................. H04L 7/00
[52] U.S. Cl. ............................................................. 375/368
[58] Field of Search .................................... 375/354, 365, 375/368; 370/503, 509, 517; 348/500, 513, 521, 540, 725, 726, 21

[56] References Cited

U.S. PATENT DOCUMENTS 5,548,339  8/1996  Kim ........................................ 348/525
5,877,816  3/1999  Kim ........................................ 348/526

*Primary Examiner*—Stephen Chin
*Assistant Examiner*—Lenny Jiang
*Attorney, Agent, or Firm*—Sughrue, Mion, Zinn Macpeak & Seas, PLLC

[57] ABSTRACT

A data segment synchronizing signal detecting circuit for reducing bit resolution of an HDTV without affecting its function. The apparatus includes a hard limiter added between a four-symbol correlator and an adder, to obtain a 2-bit output of three-level values for a four-bit input. The circuit may also include a first symbol delay for delaying an output of a symbol correlator by a factor N corresponding to a number of symbols of one segment, a first adder for adding the value delayed by the first symbol delay and the output of the symbol correlator, and accumulating the added result, a first maximum value location detector for detecting a first location of a first maximum value of the added result accumulated in the first adder, a second symbol delay for delaying the output of the symbol correlator by (one segment symbol)/N, according to the first maximum value detected by the first maximum value location detector, a second adder for adding the value delayed by the second symbol delay and the output of the symbol correlator, and accumulating the added result, a second maximum value location detector for detecting a second location of a second maximum value of the added result accumulated in the second adder, and a synchronizing signal generator for generating a segment synchronizing signal, according to an output of the second maximum value location detector.

11 Claims, 6 Drawing Sheets

METHOD AND CIRCUIT FOR DETECTING DATA SEGMENT SYNCHRONIZING SIGNAL IN HIGH-DEFINITION TELEVISION

BACKGROUND OF THE INVENTION

1. Field of the Invention

The present invention relates to a circuit for detecting a data segment synchronizing signal in a high-definition television (HDTV), and in particular, to a method and circuit for detecting a data segment synchronizing signal in an HDTV, which minimizes the number of gates required for the HDTV when the HDTV is realized in ASIC (i.e., Application Specific Integrated Circuit). The present invention is based on Korean Patent Application Nos. 21886/1996 and 21547/1997, which are incorporated herein by reference.

2. Description of the Related Art

Generally, in an HDTV system, a synchronizing signal is added before a signal is transmitted in a unit of a horizontal line from a TV broadcasting station. A receiver receiving the transmitted signal detects the synchronizing signal from the transmitted signal, synchronizes the transmitted signal with a horizontal line signal, and then processes the synchronized signal. The form of transmission data of a horizontal line depends on the HDTV system.

FIGS. 1 and 2 show the configurations of a data segment of U.S. Grand Alliance (GA) HDTV. One data frame consists of 626-line segments, and one segment is composed of 832 symbols which consists of 828 symbol data and four symbol data segment synchronizing signals 101, as shown in detail in FIG. 2A. One data segment corresponds to one horizontal line of the NTSC (i.e., National Television System Committee) system. The data segment synchronizing signal consists of four symbols which indicate the start of each data segment. The data segment synchronizing signal is composed in a specific pattern such that the four symbols have signal levels of +5, −5, −5 and +5, and the data segment signals have random signal levels.

Therefore, in a circuit receiving a transmission signal of the GA system, the data segment synchronizing signal is detected in the initial four-symbol period of each data segment, to thereby solve timing recovery problems and to synchronize received data segment signals. Accordingly, the detection of the data segment synchronizing signal affects the performance of the GA-VSB (i.e., Vestigial Sideband) system. An apparatus and method for generating a data segment synchronizing signal from data received are disclosed in Korean Patent Application Nos. 95-15218, 95-30746 and 96-21886.

Another general method of generating a segment synchronizing signal is explained with reference to FIG. 3. A separator 303 separates the most significant bit (hereinafter, "MSB") from eight bits of output of a filter (not shown), and uses the MSB as a reference signal. A four-symbol correlator 305 receives the MSB, and creates a symbol of location correlation between data. Since the four-symbol correlator uses only MSB as described above, 4 is output only in the case where the symbol is (+),(−),(−) and (+), and −4, −2, 0 and 2 are output in other cases. The output of the four-symbol correlator 305 is added to the output of a one-segment delay 309, that is the output from the same location as that of a preceding segment, in adder 307, and the added result is accumulated.

The output of adder 307 is sent to a maximum value detector 311. Maximum value detector 311 observes the output of the accumulated correlation symbol for 832 symbols (i.e., one segment), judges the location where the maximum value appears as a segment synchronous location, and then applies this information to a synchronizing signal generator 313. Synchronizing signal generator 313 generates a synchronizing pulse at the segment synchronous location.

As shown in FIG. 3, in the general apparatus for generating a segment synchronizing signal, because the output of the four-symbol correlator 305 is four bits, the adder and 832-symbol (i.e., one-segment) delay are required to accumulate a four-bit output. Thus, bit resolution of the apparatus is at least 8 bits. When this apparatus is realized in ASIC, an 832-symbol delay is needed, so that the apparatus requires 8bits×832×7bits gates. Accordingly, the general apparatus requires a large number of gates to perform its functions.

SUMMARY OF THE INVENTION

An object of the present invention is to provide a method and circuit for reducing the bit resolution of an HDTV without affecting its function, by using a hard limiter at the output of a correlator, thereby decreasing the number of gates required by the apparatus.

Another object of the present invention is to provide a method and circuit for detecting a segment synchronizing signal, which reduces the number of gates required to detect the segment synchronizing signal, using a plurality of delays, when the location of the maximum value is detected from a location correlation symbol.

To accomplish the objects of the present invention, a hard limiter is added to the output of a four-symbol correlator, to generate a segment synchronizing signal, thereby reducing the number of required gates.

Furthermore, a value delayed from a four-symbol correlation value by an N-symbol delay is accumulated by a symbol delay, where N is one of the following factors of 832: 2, 4, 8, 13, 16, 26, 32, 52, 64, 104, 208 and 416. The location of the maximum value detected from the accumulated value, and the value delayed from the four-symbol correlation value is accumulated by an (832/N)-symbol delay, where N is one of 416, 208, 104, 64, 52, 32, 26, 16, 13, 8, 4 and 2. Then, the location of the maximum value is detected from the accumulated value, to thereby generate a segment synchronizing signal.

DETAILED DESCRIPTION OF THE PREFERRED EMBODIMENT

Figure 1:
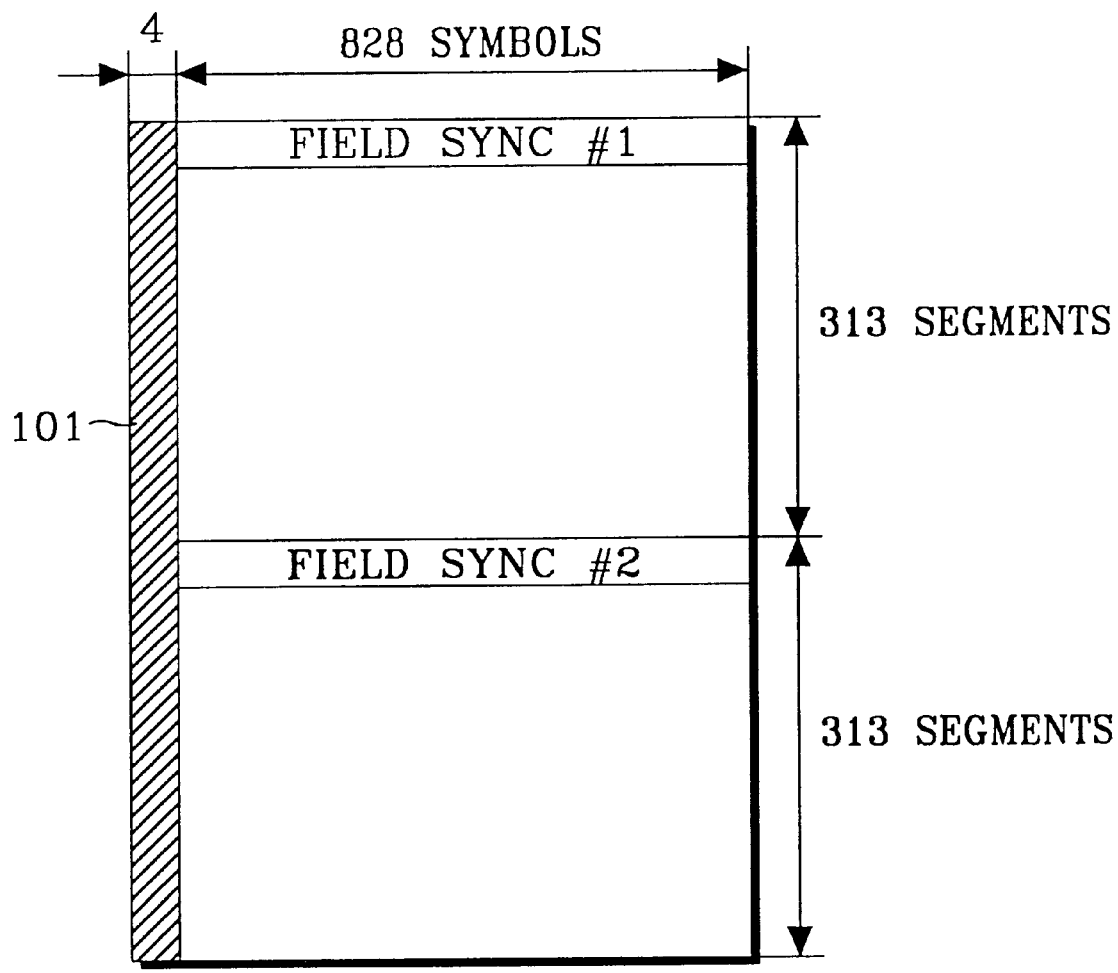
FIG. 1 shows a data format of U.S. GA-VSB HDTV system.
Figure 2A:
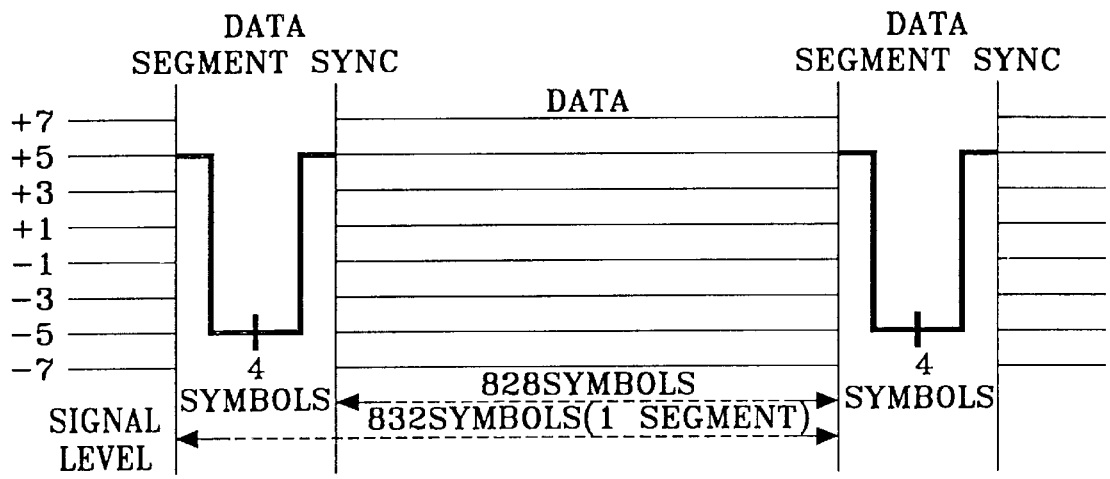
FIGS. 2(A) and 2(B) shows a format of a data segment synchronizing signal.
Figure 2B:
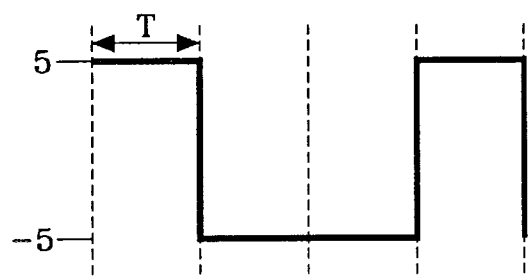
Figure 3:
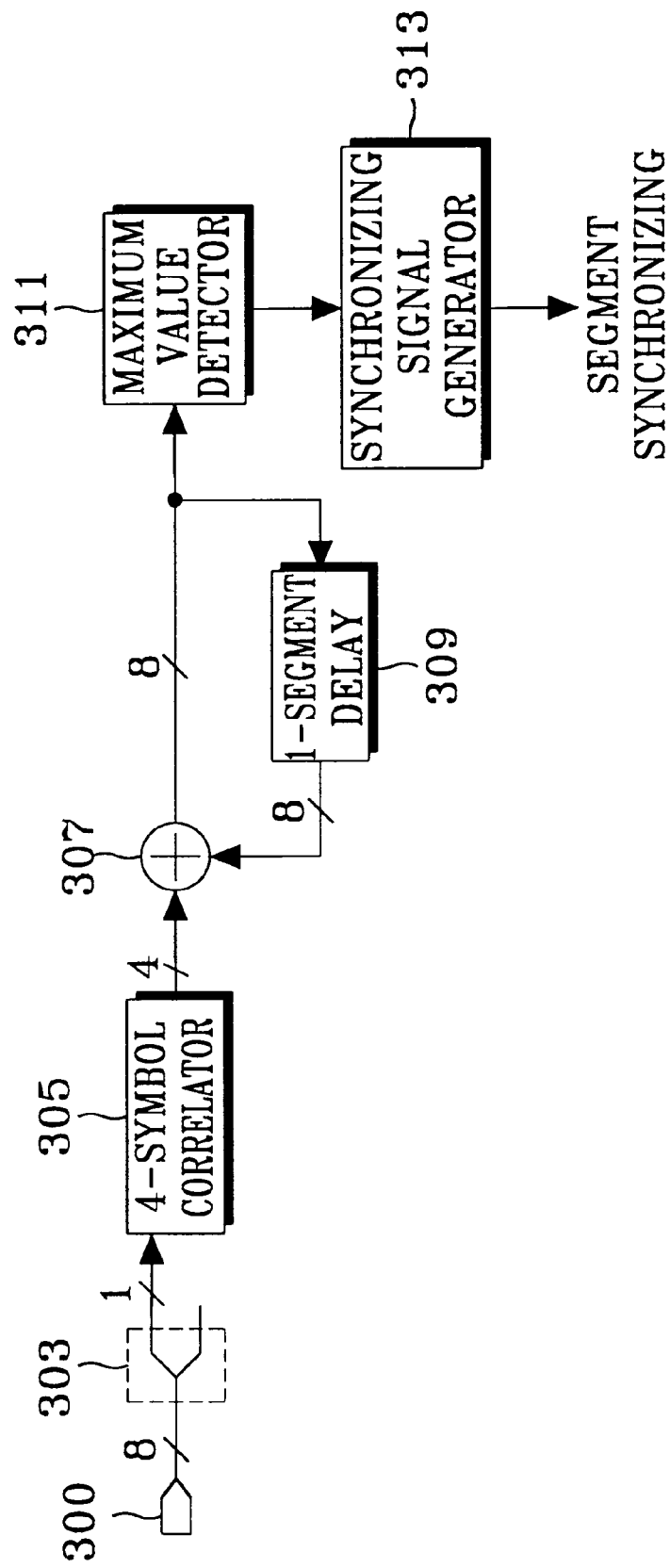
FIG. 3 is a block diagram of a data segment synchronizing signal detecting circuit in a general HDTV system.
Figure 4:
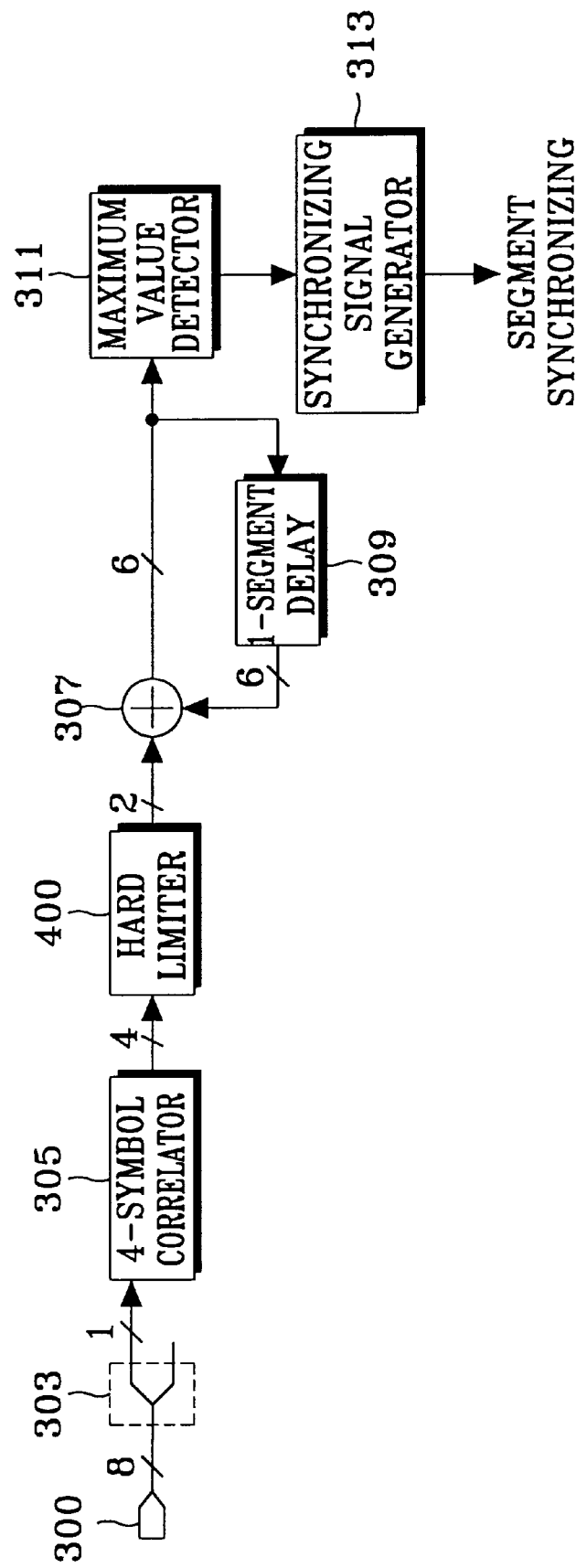
FIG. 4 is a block diagram of a data segment synchronizing signal detecting circuit of a GA-VSB HDTV system according to an embodiment of the present invention.

FIG. 4 is a block diagram of a data segment synchronizing signal detecting circuit of a GA-VSB HDTV system according to an embodiment of the present invention. As shown in FIG. 4, the data segment synchronizing signal detecting circuit of the present invention is constructed in such a manner that a hard limiter 400 is added between a four-symbol correlator 305 and an adder 307. The hard limiter 400 generates a 2-bit output having one of three values from a four-bit input.

Figure 5:
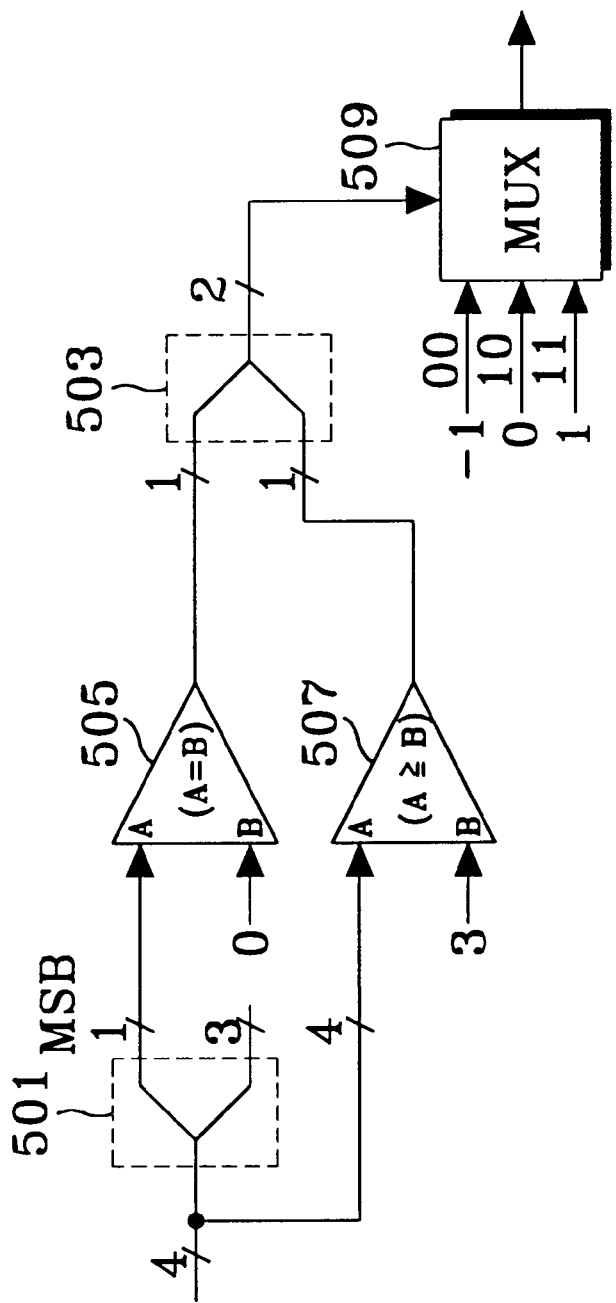
FIG. 5 is a circuit diagram of the hard limiter of FIG. 4.

FIG. 5 shows the detailed circuit of the hard limiter 400 of FIG. 4. The hard limiter consists of a separator 501 for separating the MSB from the four-bit output of the four-symbol correlator 305, a first comparator 505 for comparing the MSB with a level "0" and for determining whether the values are identical (i.e., whether A=B), a second comparator 507 for comparing the four-bit output of the four-symbol correlator 305 with a level "3" and for determining whether the four-bit output is larger than the level "3" (i.e., whether A>B), a synthesizer 503 for synthesizing the outputs of the first and second comparators 505 and 507, respectively, and a multiplexer 509 for selecting one of levels −1(00), 0(10) and 1(11), according to the output of the synthesizer 503.

Preferred embodiments of the present invention will be explained below with reference to FIGS. 4, 5 and 6.

Separator 303 separates the MSB from the eight bits output from a filter (not shown). The MSB is correlated in the four-symbol correlator 305. This correlation technique is conventional, so an explanation thereof will be omitted here. The four bits correlated in the four-symbol correlator 305 are applied to the hard limiter 400 as shown in the following Table 1. Hard limiter 400 receives the four bits from the four-symbol correlator 305, and separates the MSB using separator 501 included in the hard limiter 400, as shown in FIG. 5.

TABLE 1

| Input | Output |
|-------|--------|
| −4, −2 | −1 |
| 0, 2 | 0 |
| 4 | 1 |

The MSB is applied to the first comparator 505, and the output of four-symbol correlator 305 is applied to the second comparator 507. First comparator 505 compares the MSB with a level "0". Here, when the MSB is lower than the level "0", the input of first comparator 505 is "1", and its output is "0". Second comparator 507 compares the four-bit output of four-symbol correlator 305 with a level "3". When the input is lower than level "3", the output of the second comparator 507 is "0". Thus, the output of synthesizer 503 becomes 00, and multiplexer 509 selectively outputs "−1". When the input from four-symbol correlator 305 has a value between "00" and "3", the outputs of first and second comparators 505 and 507 are "1" and "0", respectively, and multiplexer 509 outputs "0" corresponding to the input "10". When the input has a value equal to or greater than "3", the input of multiplexer 509 becomes "11", so that the multiplexer 509 selectively outputs "1".

Figure 6:
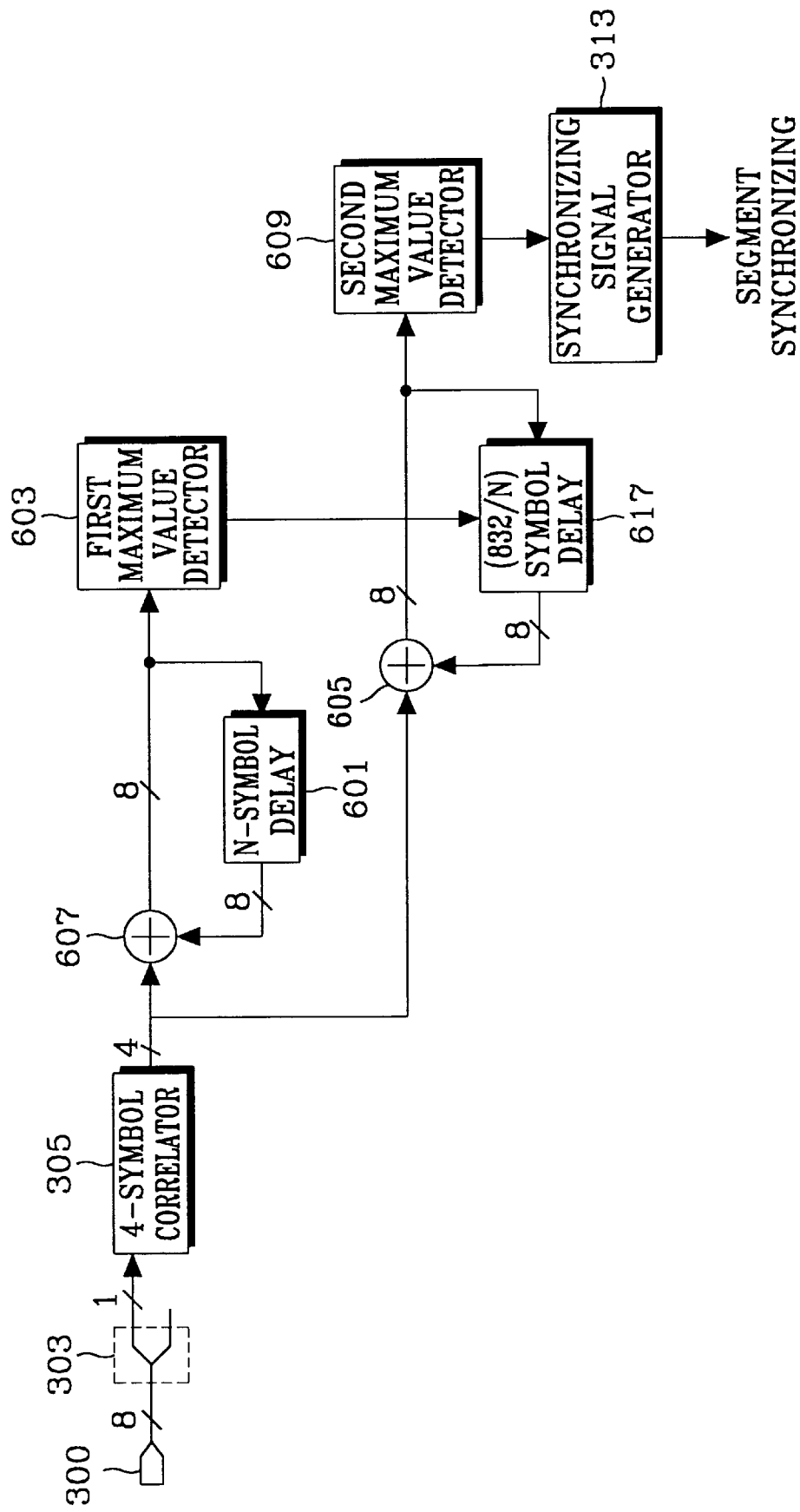
FIG. 6 is a block diagram of a data segment synchronizing signal detecting circuit of a GA-VSB HDTV system according to another embodiment of the present invention.

FIG. 6 is a block diagram of a data segment synchronizing signal detecting circuit of a GA-VSB HDTV system according to another embodiment of the present invention. Referring to FIG. 6, first and second adders 607 and 605, respectively, are connected to the output of the four-symbol correlator 305. First adder 607 adds the correlation value output from four-symbol correlator 305 and an all symbol value which is delayed by an N-symbol delay 601, that is, a first symbol delay, in a unit of a segment, and accumulates the added result. The output of first adder 607 is applied to a first maximum value detector 603. First maximum value detector 603 detects the location of the maximum value of the symbol values accumulated by the first adder 607. The output of first maximum value detector 603 is applied to a (832/N)-symbol delay 617, that is, a second symbol delay.

Second adder 605 adds the correlation value of the four-symbol correlator 305 and the output value of (832/N)-symbol delay 617, and accumulates only the value corresponding to the location where the maximum value of the correlation value is detected, using a maximum value location detection control signal from the first maximum value detector 603. That is, first maximum value detector 603 detects the location of the maximum value in one generated segment. The detected value corresponding to the location of the maximum value is provided as a control signal to the (832/N)-symbol delay 617. When the control signal is enabled, (832/N)-symbol delay 617 selects the values during the enable period. These selected values are accumulated in the second adder 605, and then applied to a second maximum value detector 609. When the second maximum value detector 609 selects the maximum value from the values accumulated in the second adder 605, and applies the maximum value to a synchronizing signal generator 313, a synchronizing signal is generated at the location of the maximum value.

With the first and second symbol delays of N-symbol delay 601 and (832/N)-symbol delay 617, respectively, N may be one of 13, 16, 32 and 64, which are factors of 832. For example, when N-symbol delay 601 is a 13-symbol delay, (832/N) symbol delay 617 is a 64-symbol delay. Accordingly, in the case of N=64, thirteen (=832/N) symbol location correlation values of 1, 65, 129, 193, 257, . . . , 769 are input to the first register of 64 shift registers, after 832 symbols. Similarly, thirteen symbol correlation values, which have the interval of 64 symbols, can be accumulated in each of remaining 63 registers.

With the above-described circuit of the present invention, when the value of N is specified to a factor of 832 (i.e., 2, 4, 8, 13, 16, 26, 32, 52, 64, 104, 2,08, 416), the number (K) of required registers can be represented as K=N+(832/N), other than the general circuit requiring 832 registers for processing 832 symbols. That is, when N is 2, K=2+(832/2)=418, and K=416+(832/416) when N is 416. Accordingly, the number of registers is reduced by 50%, thereby decreasing the number of gates required for the circuit realized in ASIC.

As described above, in the data segment synchronizing signal detecting circuit of the present invention, the two-bit output is obtained from the four-bit input using the hard limiter, and this output is applied to an accumulator consisting of an adder and a one-segment delay. It has been determined by experiment that when the signal-to-noise ratio is OdB, a correlated segment synchronizing signal is generated when the accumulated correlated result at the segment synchronizing location is greater than 8. That is, approximately 6 bits are sufficient for the accumulated result. Accordingly, the number of gates required for the circuit realized in ASIC becomes approximately 6bits×832× 7bits=34,944. That is, the present invention requires approximately 12,000 fewer gates than the general circuit.

Furthermore, the bit resolution of the apparatus is also decreased, mitigating complexity of other operators. The data segment synchronizing signal detecting circuit of the present invention divides and processes the delay of the segment. That is, all segments are accumulated first, the location of the maximum value of each symbol is detected in a one segment symbol, the symbol value corresponding to the location is accumulated secondarily, and the location of the maximum value is detected from the second accumulated values, to thereby generate the synchronizing signal. Accordingly, there is no need to accumulate and process all symbol values for the location correlation symbol of one segment. This remarkably reduces the number of gates of an ASIC circuit which detects a data segment synchronizing signal.

While only certain embodiments of the invention have been specifically described herein, it will apparent that numerous modifications may be made thereto without departing from the spirit and scope of the invention.

What is claimed is:

1. A data segment synchronizing signal detecting circuit, comprising:
    a four-symbol correlator;
    an adder; and
    a hard limiter disposed between the four-symbol correlator and the adder;
    wherein the hard limiter accepts a four-bit input from the four-symbol correlator, and outputs a 2-bit value having one of three levels, said 2-bit value represents a pattern of the most significant bits of four consecutive symbols of a received symbol.

2. The circuit as claimed in claim 1, wherein the hard limiter comprises:
    a separator for separating the most significant bit (MSB) from the received signal and outputting the MSB to the four-symbol correlator;
    a first comparator for comparing the MSB with a level "0", and determining whether they are identical;
    a second comparator for comparing the output of the four-symbol correlator with a level "3", and determining whether the output of the four-symbol correlator is greater than the level "3";
    a synthesizer for synthesizing the outputs of the first and second comparators; and
    a multiplexer for selecting a level from the group consisting of −1(00), 0(10) and 1(11), according to the output of the synthesizer.

3. A method of detecting a data segment synchronizing signal in an HDTV system, comprising the steps of:
    obtaining a correlation value corresponding to a predetermined location from received data;
    delaying firstly the correlation value in units of N symbols, which is a factor of 832 symbols for one segment;
    accumulating the firstly delayed correlation value;
    detecting a value corresponding to a location of a maximum value;
    selecting a corresponding location correlation value from the segment symbols according to the detected value;
    delaying secondly the detected value by 832/N;
    accumulating the secondly delayed value;
    generating a segment synchronizing signal according to the detected value corresponding to the location of the maximum value.

4. The method as claimed in claim 3, wherein N of the delaying firstly step is selected from the group consisting of 2, 4, 8, 13, 16, 26, 32, 52, 64, 104, 208 and 416.

5. The method as claimed in claim 3, wherein 832/N of the delaying secondly step is selected from the group consisting of 416, 208, 104, 64, 52, 32, 26, 16, 13, 8, 4 and 2.

6. A circuit for detecting a data segment synchronizing signal in an HDTV system, comprising:
    a separator for separating a most significant bit (MSB) from received data;
    a symbol correlator for receiving the MSB, and creating a symbol of location correlation;
    a first symbol delay for delaying an output of the symbol correlator by a factor N corresponding to a number of symbols of one segment;
    a first adder for adding the value delayed by the first symbol delay and the output of the symbol correlator, and accumulating the added result;
    a first maximum value location detector for detecting a first location of a first maximum value of the added result accumulated in the first adder;
    a second symbol delay for delaying the output of the symbol correlator by (one segment symbol)/N, according to the first maximum value detected by the first maximum value location detector;
    a second adder for adding the value delayed by the second symbol delay and the output of the symbol correlator, and accumulating the added result;
    a second maximum value location detector for detecting a second location of a second maximum value of the added result accumulated in the second adder; and
    a synchronizing signal generator for generating a segment synchronizing signal, according to an output of the second maximum value location detector.

7. The circuit as claimed in claim 6, wherein N of the first symbol delay is selected from the group of factors of 832 consisting of 2, 4, 8, 13, 16, 26, 32, 52, 64, 104, 208 and 416.

8. The circuit as claimed in claim 6, wherein the (one segment symbol)/N of the second symbol delay is selected from the group of factors consisting of 416, 208, 104, 64, 52, 32, 26, 16, 13, 8, 4 and 2.

9. A method of detecting a data segment synchronizing signal in an HDTV system, comprising the steps of:
    separating a most significant bit (MSB) from received data;
    correlating the MSB so as to create a symbol of location correlation;
    delaying an output of the symbol correlator, using a first symbol delay, by a factor N corresponding to a number of symbols of one segment;
    adding the value delayed by the first symbol delay and the output of the symbol correlator, using a first adder, and accumulating the added result;
    detecting a first location of a first maximum value of the added result accumulated in the first adder, using a first maximum value location detector;
    delaying the output of the symbol correlator by (one segment symbol)/N, according to the first maximum value detected by the first maximum value location detector, using a second symbol delay;
    adding the value delayed by the second symbol delay and the output of the symbol correlator, using a second adder, and accumulating the added result;
    detecting a second location of a second maximum value of the added result accumulated in the second adder, using a second maximum value location detector; and generating a segment synchronizing signal, using a synchronizing signal generator, according to an output of the second maximum value location detector.

10. The method as claimed in claim 9, wherein N of the first symbol delay is selected from the group of factors of 832 consisting of 2, 4, 8, 13, 16, 26, 32, 52, 64, 104, 208 and 416.

11. The method as claimed in claim 9, wherein the (one segment symbol)/N of the second symbol delay is selected from the group of factors consisting of 416, 208, 104, 64, 52, 32, 26, 16, 13, 8, 4 and 2.

* * * * *